(12) United States Patent  (10) Patent No.: US 8,408,544 B2
Reinke et al. (45) Date of Patent: Apr. 2, 2013

(54) SORTING BY CONTROLLING SCANNED DOCUMENT VELOCITY

(75) Inventors: Stephen M. Reinke, Rochester, NY (US); Robert M. Westcott, Holley, NY (US); Randall R. Maysick, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/155,838

(22) Filed: Jun. 8, 2011

(65) Prior Publication Data

US 2012/0313312 A1     Dec. 13, 2012

(51) Int. Cl.
*B65H 39/10* (2006.01)
(52) U.S. Cl. .......... 271/288; 271/299; 271/202
(58) Field of Classification Search .......... 271/279, 271/287, 288, 298, 299, 207, 202
See application file for complete search history.

(56) References Cited

U.S. PATENT DOCUMENTS

| 5,186,454 | A | * | 2/1993 | Kitahara | 271/288 |
| 5,741,009 | A | * | 4/1998 | Kawano et al. | 271/182 |
| 6,095,516 | A | * | 8/2000 | Sawano et al. | 271/207 |
| 6,260,843 | B1 | * | 7/2001 | Hoshimura et al. | 271/213 |
| 6,378,864 | B1 | * | 4/2002 | Iesaka | 271/270 |
| 6,480,697 | B2 | * | 11/2002 | Kojima | 399/404 |
| 7,777,919 | B2 |  | 8/2010 | Malatesta |  |
| 7,828,279 | B2 | * | 11/2010 | Hammen | 271/3.14 |
| 2007/0102871 | A1 | * | 5/2007 | Acton et al. | 271/207 |

* cited by examiner

*Primary Examiner* — Prasad Gokhale
(74) *Attorney, Agent, or Firm* — Raymond L. Owens

(57) ABSTRACT

A method of scanning documents and moving such documents along a path such that after scanning sorting such documents is disclosed. The method includes providing a plurality of documents in an input tray and transporting each document along the path from the input tray at a transport velocity past the scanner to obtain scanned image data. The method further includes providing at least two movable members including two rotatable exit rollers, movable belts, or a movable belt and a rotatable exit roller along the path to provide a nip for the documents; and selectively driving the movable members to provide selectable exit velocities so that such documents are sorted in accordance with their selected exit velocity.

6 Claims, 9 Drawing Sheets

SORTING BY CONTROLLING SCANNED DOCUMENT VELOCITY

FIELD OF THE INVENTION

The present invention relates to sorting scanned documents by controlling the exit velocity.

BACKGROUND OF THE INVENTION

There is a need to automatically sort documents which are fed through scanner systems to eliminate post document scanning manual handling and to eliminate sorting errors which can occur due to manual sorting operations. One example of a required sorting application is the sorting of payment checks from their accompanied forms and letters, which need to be scanned. In general, there is a need to sort documents based on their width, thickness, shape, condition, color, weight, document count and content.

Automatically sorting documents often requires devices such as a diverter gate actuated by a solenoid or other drive arrangements as shown in U.S. Pat. No. 7,777,919. In operation, diverter gates are often noisy when they are actuated, which is a significant issue in an office environment. Diverter gate devices require additional space along the document transport path which in turn increases the overall document feeding and sorting system size. Also, diverter gate devices add complexity to a document feeding and sorting system, and often require very high speed actuation which can require additional maintenance. Diverter gates can become a document jam point in a sorting system, because documents being sorted are often bent in the process of being transferred to different sorting bin or exit tray locations.

Other devices for sorting documents, such as using a suction cup device to pick and place documents, or using compressed air devices to blow documents to different sorting bin locations required vacuum or compressed air services, and require added space, complexity and operating expense.

Commonly assigned U.S. Pat. No. 7,828,279 discloses a method of scanning documents taken from an input tray and delivering them to an exit tray. The velocity of exit nip transport can be selected based on the timing of trailing edge detection. As taught in U.S. Pat. No. 7,828,279, controlling the exit nip velocity provides a way to maintain document stacking order for varying sizes and weights of documents.

SUMMARY OF THE INVENTION

There is a need for a scanner system which sorts scanned documents effectively without the use of additional actuated devices such as gates, diverters or pick and place devices along the document transport path. These additional devices add space, complexity, noise and cost to a document scanner system. There is also a need for a scanning system which can provide sorted stacks of documents with aligned leading or trailing edges to benefit post document handling.

In accordance with the present invention there is provided a method of scanning documents and moving such documents along a path such that after scanning sorting such documents comprising:

providing a plurality of documents in an input tray;

transporting each document along the path from the input tray at a transport velocity past a scanner to obtain scanned image data;

providing at least two movable members including two rotatable exit rollers, movable belts, or a movable belt and a rotatable exit roller along the path to provide a nip for the documents; and selectively driving the movable members to provide selectable exit velocities so that such documents are sorted in accordance with their selected exit velocity.

An advantage of the present invention is that by controlling the velocity of scanned documents driven by movable members the documents can be effectively sorted into different positions within an exit tray, or scanned documents can be sorted into multiple exit trays.

The present invention also effectively maintains document order for a very large range of documents types, including document size and weight.

The present invention also is capable of providing sorted stacks of documents with aligned leading or trailing edge registration, which is advantageous for subsequent manual handing and storage of the stacked documents.

In addition, the present invention can operate over a large range of scanning transport velocities, because the movable members exit velocity can be selectively set independent of the scanning transport velocity.

Another feature of the present invention is no additional actuated devices (such as gates or diverters) are required along the document path to achieve sorting of documents. Eliminating the need for gates or diverters reduces the scanner system size, complexity, maintenance, and the scanner system cost.

Finally, the present invention provides a low noise method of sorting documents, without the addition of actuated devices within the documents transport path.

DETAILED DESCRIPTION OF THE INVENTION

Figure 1:
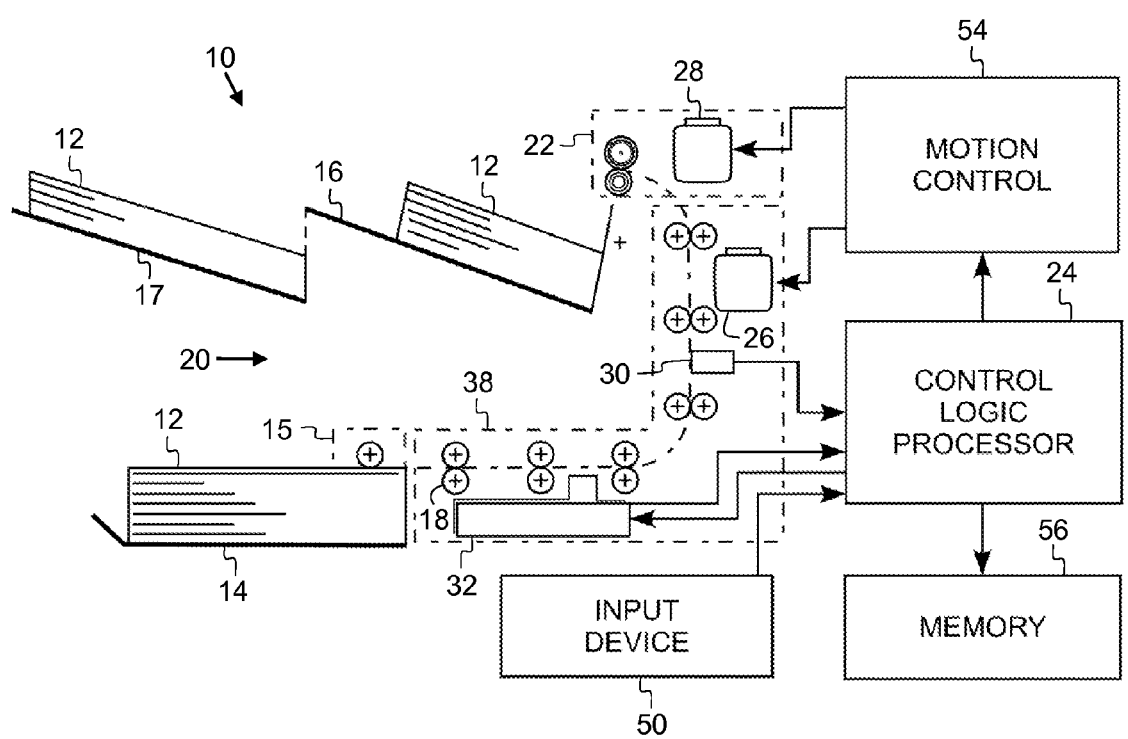
FIG. 1 is a schematic of a scanning system in accordance with an embodiment of the invention that includes a block diagram of the control electronics.

In certain embodiments of the present invention a combination of edge sensing, transport timing, exit nip velocity adjustments, and exit tray design to preserve the document order of documents placed in a scanner system input tray and delivered to a scanner system exit tray or exit trays can be used. Referring to FIG. 1, there is shown a schematic view of a scanner system 10 and its transport 20 which provides document handling according to the present invention. At the start of the scanning process a plurality of documents is placed into an input tray 14. The document stack 12, for example can contain different types of documents of various sizes and content stacked in a preferred order which require scanning and sorting.

The transport 20 has a conventional document feed mechanism 15 which can feed the leading edge of the first document of the document stack 12 into a document transport apparatus 38. The documents are fed from the top of the input tray 14 document stack 12 one at a time, with a controlled gap length between each document being transported in the document path of the transport 20. The single document is fed through the document transport apparatus 38 past a seamier 32, and a document edge detection sensor 30. The scanner 32 includes a linear image sensor or an area array image sensor (not shown). As the document is fed past the scanner 32, its scanned image data are captured and transferred by a control logic processor 24 and then to memory 56. The scanned image data for each document can be used in support of any defined image sorting criteria. In addition, as the document is fed past the sensor 30, the document's leading edge and trailing edge are sensed. A control logic processor 24 can use the sensor 30 leading and trailing edge sensing timing to estimate each document length, and use the estimated length in support of any defined document length sorting criteria. The document is then fed to the exit nip transport 22, where the document continues to feed and then exits the exit nip transport 22 into an exit tray (first exit tray 16 or second exit tray 17). The document feeding and scanning process is continued for the remaining documents in the document stack 12, until all the documents have exited the exit nip transport 22 and the completed documents are transferred into their selected output tray, the first exit tray 16 or the second exit tray 17. Because of the overall "C" shape of the scanner system's paper path, when the scanned document stacks 12 in the exit trays are manually flipped over the original order of the document stack 12 placed in the input tray 14 is preserved.

Multiple paired rollers 18 are used within the transport 20 to transport documents past the scanner 32 and the sensor 30. A first motor 26 drives the document transport apparatus 38 of the transport 20 at a constant transport velocity. A second motor 28 drives the exit nip transport 22 and provides selectable exit velocities. The control logic processer 24 communicates with a motor control 54 and processes the signal of the sensor 30 to control the timing and velocities of the first motor 26 and second motor 28. In addition, the control logic processer 24 processes the scanned image data from the scanner 32 and the resulting image data files are sorted to memory 56. The control logic processer 24 receives document sorting criteria from the operator via an input device 50, such as a key pad, touch screen or personal computer key board. One specific example of a sorting criteria, is sorting documents by their length into two separate exit trays. For example, documents shorter than 8.4" in length are transferred into the first exit tray 16 and documents 8.4" in length or longer are transferred into the second exit tray 17 to sort these documents of varying lengths.

Figure 2A:
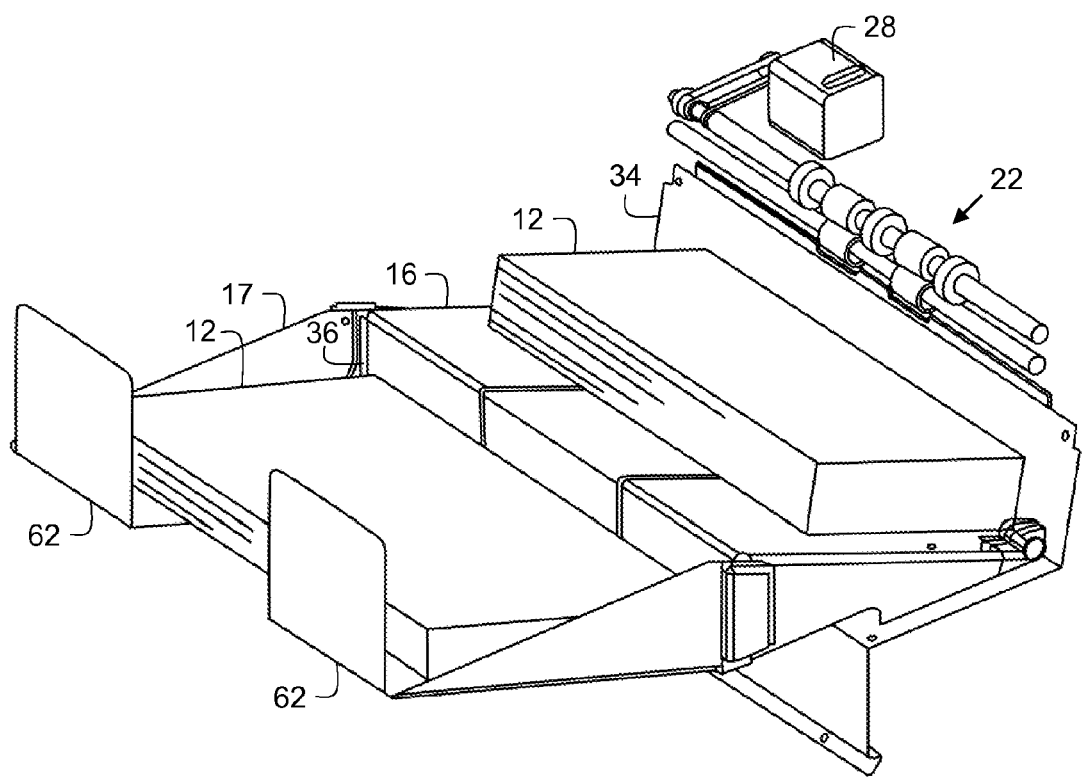
FIG. 2A is a pictorial of a portion of the scanning system shown in FIG. 1 and depicting two exit trays and exit nip transport.
Figure 2B:
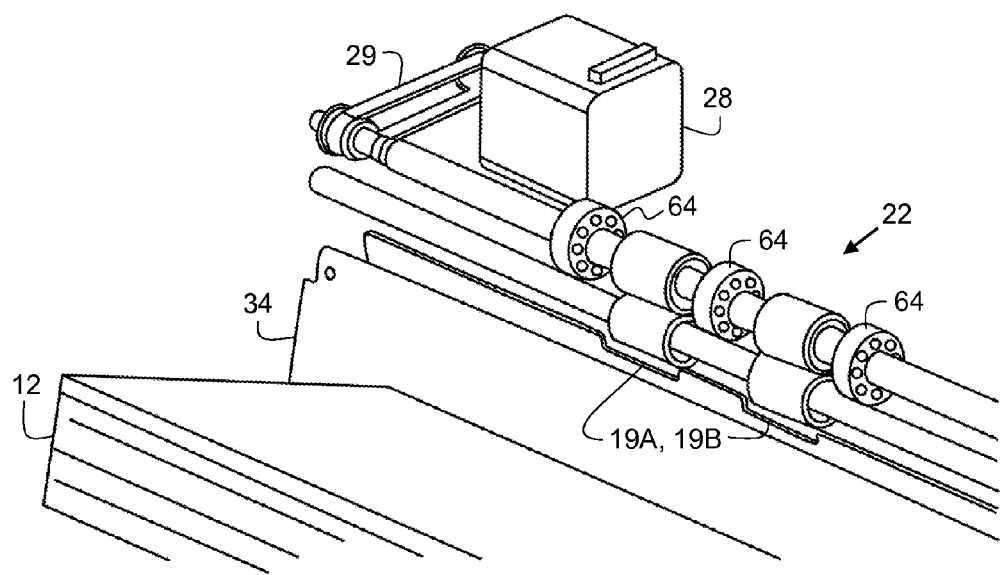
FIG. 2B is a partial pictorial of a portion of the scanning system shown in FIG. 2A depicting exit rollers and corrugation tires.
Figure 2C:
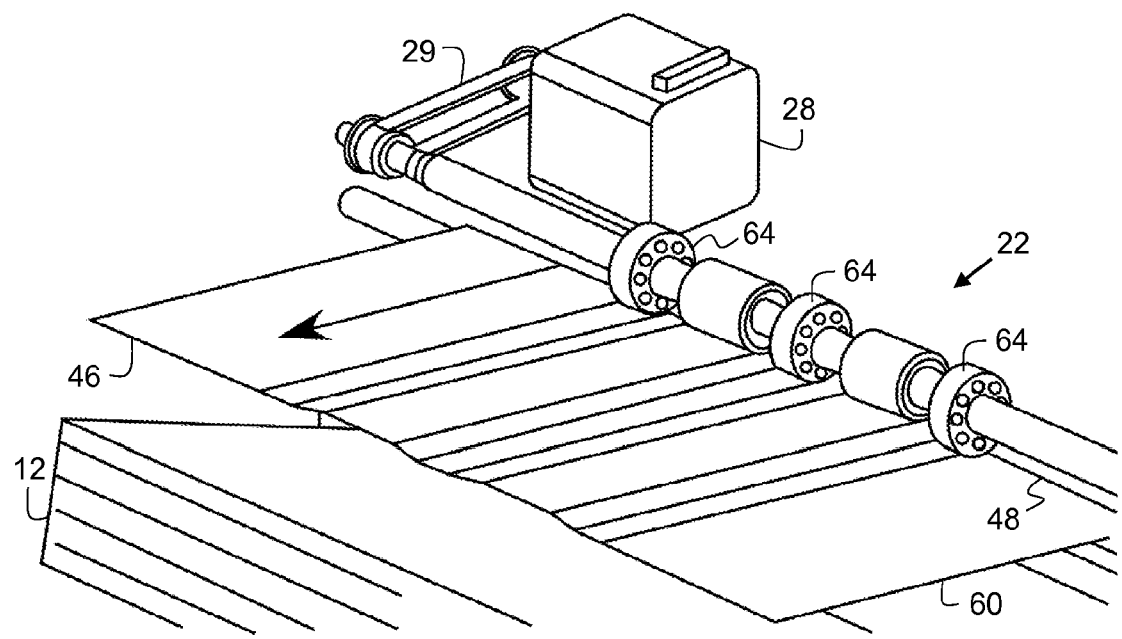
FIG. 2C is a partial pictorial of a portion of the scanning system shown in FIG. 2A depicting a document exiting the exit nip transport.

Referring to FIGS. 2A, 2B and 2C, the exit nip transport 22 and exit trays 16 and 17 are shown. The second motor 28 drives movable members 19A and 19B, via a belt and pulley arrangement 29. The movable members 19A and 19B are two rotatable exit rollers in this arrangement. In addition to the exit rollers (movable members 19A and 19B), corrugation tires 64 are provided on one of the exit roller shafts. The corrugation tires 64 have a larger diameter than the exit rollers (movable members 19A and 19B) and cause an exiting document 60 to corrugate slightly which effectively creates a stiffer cantilevered document before the document 60 is released from the exit nip transport 22. Corrugating the exiting document 60 provides more positional control of thinner documents as they are launched from the exit nip transport 22. Also, corrugating the exiting document 60 permits the document to be launched a further distance (12" for example) in a more controlled fashion, which is desired for longer documents. In addition, corrugating the exit document 60 provides more positional control for launching documents at a greater range of exit velocities (4 to 54 inches/second for example). For example, it is preferred that the exiting document 60 which is being launched from the exit nip transport 22 to the second exit tray 17 does not come in contact with the document stack 12 in the first exit tray 16 to provide good positional control of the launched document. Corrugating the exit document 60 can facilitate this requirement.

In addition to corrugating the exiting document 60, providing a back stop 62 to limit the travel of the launched document 60 is of benefit. The back stop 62 can include a sound absorbing material such as a foam or rubber to reduce the noise generated when a leading edge 46 of the document 60 contacts the back stop 62. To provide trailing edge registration surfaces for the document stacks 12 in the exit trays 16 and 17, a back wall 34 and a lead edge back wall 36 are provided.

Referring to FIGS. 3A, 3B, 3C and 3D, there are shown schematic views of different arrangements of movable members 19A and 19B which provide selectable exit velocities.

Figure 3A:
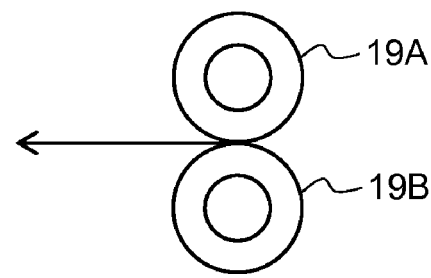
FIG. 3A is a schematic of two movable members provided by two rotatable exit rollers.

Two rotatable rollers are shown in FIG. 3A. The two rotatable exit rollers are the movable members 19A and 19B incorporated in this arrangement which form the driven nip of the exit nip transport 22.

Figure 3B:
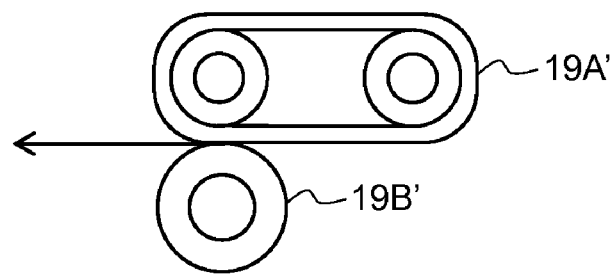
FIG. 3B is a schematic of two movable members provided by a rotatable exit roller and a movable belt.

An alternative arrangement is the use of a belt to create an exit nip. Referring to FIG. 3B, two movable members 19A' and 19B', a rotatable exit roller and a movable belt, are provided to form the driven nip of the exit nip transport 22.

Figure 3C:
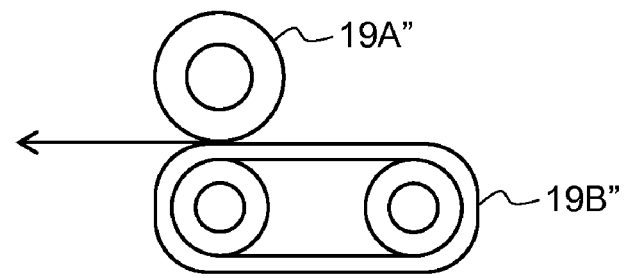
FIG. 3C is another schematic of two movable members provided by a movable belt and a rotatable exit roller.

Referring to FIG. 3C, another arrangement, two movable members 19A" and 19B", a rotatable exit roller and a movable belt, are provided to form the driven nip of the exit nip transport 22.

Figure 3D:
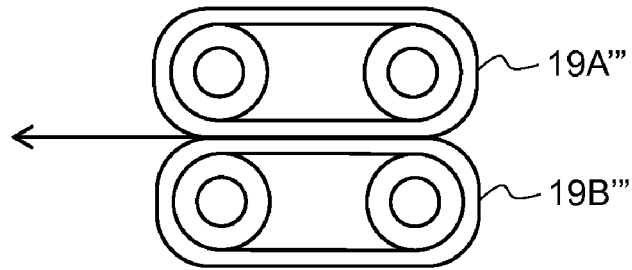
FIG. 3D is a schematic of two movable members provided by two movable belts.

Referring to FIG. 3D, two movable members 19A''' and 19B''', two movable belts, are incorporated in this arrangement. The movable belts form the driven nip of the exit nip transport 22.

Figure 4:
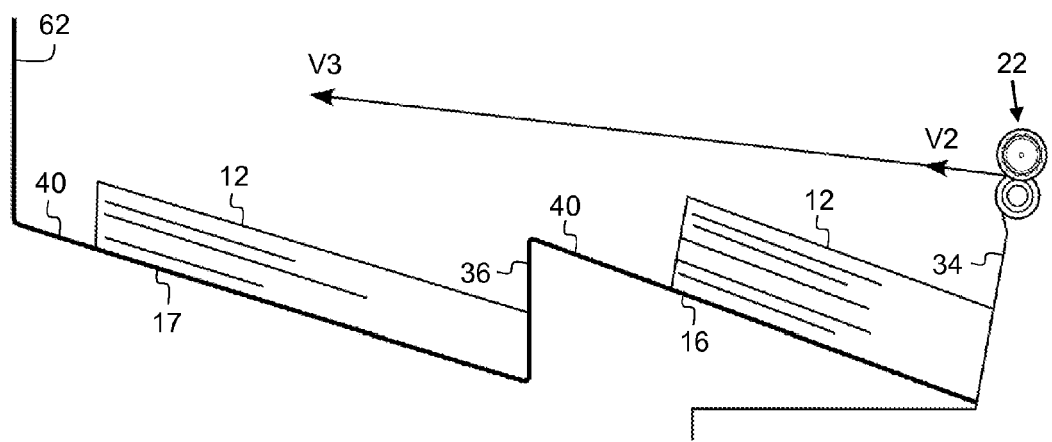
FIG. 4 is a partial side view of the scanning system shown in FIG. 2A illustrating two exiting documents' relative velocity magnitudes to provide sorting.

Now referring to FIG. 4, two exiting documents' relative velocity magnitudes and directions are shown. For example, these two documents can be sorted based on their document length. One of the documents can be longer (8.5" in length for example) than the other document (7.5" in length for example). The velocity V2 (6 inches/second for example) of one of the documents is significantly less than the velocity V3 (50 inches/sec for example) of the other document. The velocity V2 is at a magnitude that will cause the document to drop into the first exit tray 16 which is adjacent to the exit nip transport 22. The velocity V3 is at a magnitude capable of launching the exiting document 60 over the first exit tray 16 and permitting the leading edge 46 of document 60 to be stopped by the back stop 62, and then drop into the second exit tray 17.

Figure 5:
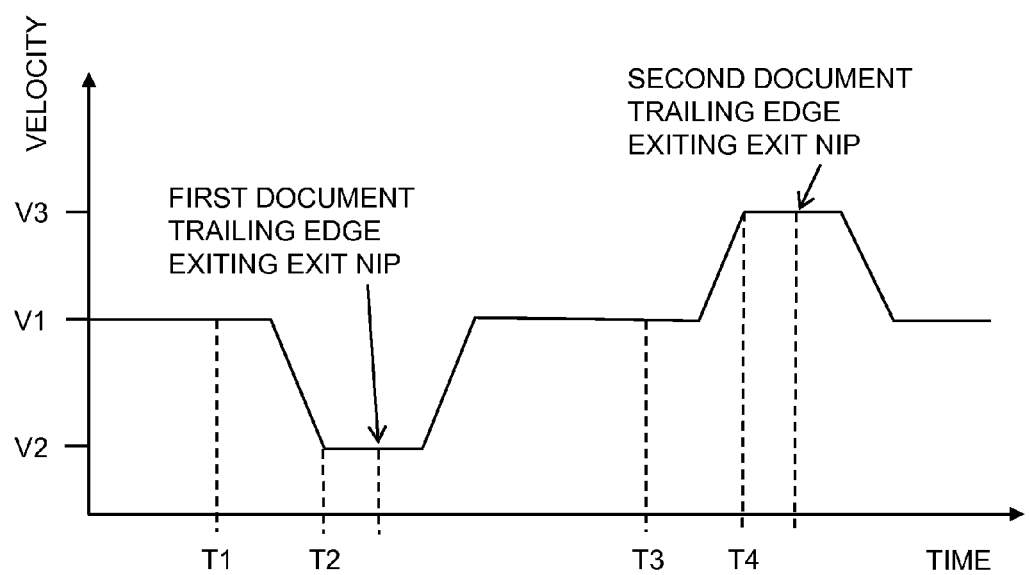
FIG. 5 is a timing diagram illustrating the velocity at the exit nip for two documents being sorted in an embodiment of the present invention.

The timing diagram shown in FIG. 5 illustrates the relative change in velocity controlled by the exit nip transport 22, motor control 54 and control logic processor 24 for two successive scanned documents. At timing T1 the sensor 30 detects the trailing edge 48 of the first document. The velocity V1 is the transport velocity used to capture the documents image by the scanner 32. The velocity V1 is known and the distance from the sensor 30 to the exit nip transport 22 is also known, permitting the control logic processor 24 to calculate an estimated arrival time of all documents' leading edges 46 and trailing edges 48 at the exit nip transport 22. The exit velocity V1 is reduced to a lower velocity V2 at timing T2 for the first document exiting the exit nip transport 22. At the lower velocity V2 the exiting document is dropped into the first exit tray 16.

Then, after the release of the trailing edge 48 of the first document from the exit nip transport 22, the velocity of the exit transport nip 22 is increased back to the original velocity V1 before the second document lead edge enters the exit nip transport 22. The gap between the trailing edge 48 of the first document and the leading edge 46 of the second document is 3.0", for example, as the documents are transported through the document transport apparatus 38. The gap between the documents provides time for the exit nip transport 22 velocity to change from the lower velocity V2 to the original velocity V1, and before the second document enters the exit nip transport 22. At timing T3 the sensor 30 detects the trailing edge 48 of the second document.

Next, the exit velocity V1 is increased to a higher exit velocity V3 at timing T4 for the second document. At the higher exit velocity V3 the second exiting document is launched from the exit nip transport 22 over the first exit tray 16 and into the second exit tray 17, thereby sorting the documents into two output document stacks 12. The velocity of the exit nip transport 22 is then returned to the initial V1 value to match the document transport apparatus 38 velocity in preparation to receive the next document.

To improve the output document stacks 12 document alignment in the first exit tray 16 and second exit tray 17, slope portions 40 are provided to permit the leading edges 46 or trailing edges 48 of the documents to align against the back wall 34 or the lead edge back wall 36. Typically, the slope portions 40 are at angles 18 to 45 degrees from horizontal to be effective for most document types and permit the dropping documents to slide across the top of the document stacks 12 in the exit trays 16 and 17 to their final resting position against the back wall 34 and the lead edge back wall 36.

Figure 6A:
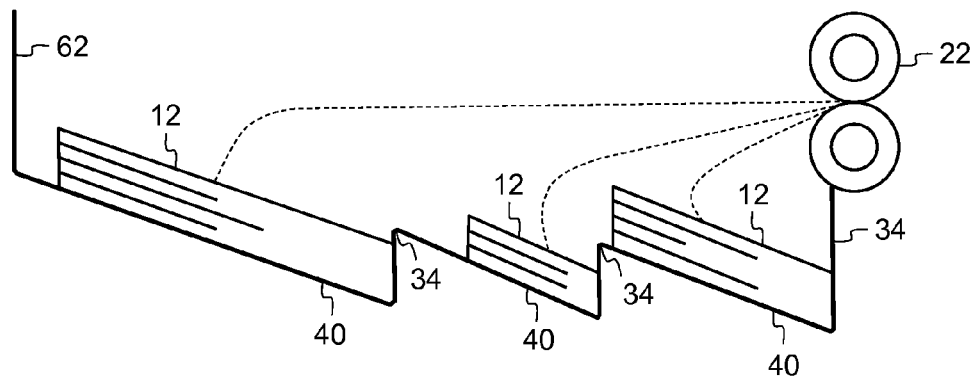
FIG. 6A is a schematic of multiple exit trays configured according to an embodiment of the present invention.

Those skilled in the art can understand there are many configurations of the present invention which use scanned document exit velocity to sort documents. FIGS. 6A, 6B, 6C and 6D are some variations in configurations. Referring to FIG. 6A, a schematic of multiple exit trays is shown. In this configuration, three different exit velocities are provided to sort documents into three separated document stacks 12, which are in three different exit trays.

Figure 6B:
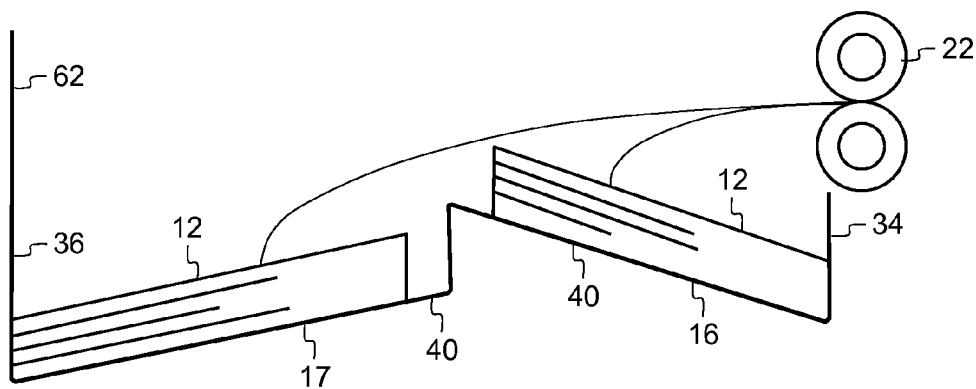
FIG. 6B is a schematic of two exit trays configured according to another embodiment of the present invention.

FIG. 6B shows a configuration of exit trays which provides trailing edge alignment for the document stack 12 in the first exit tray 16 and lead edge alignment for the document stack 12 in the second exit tray 17, which can be advantageous for stacking and removal of certain document types.

Figure 6C:
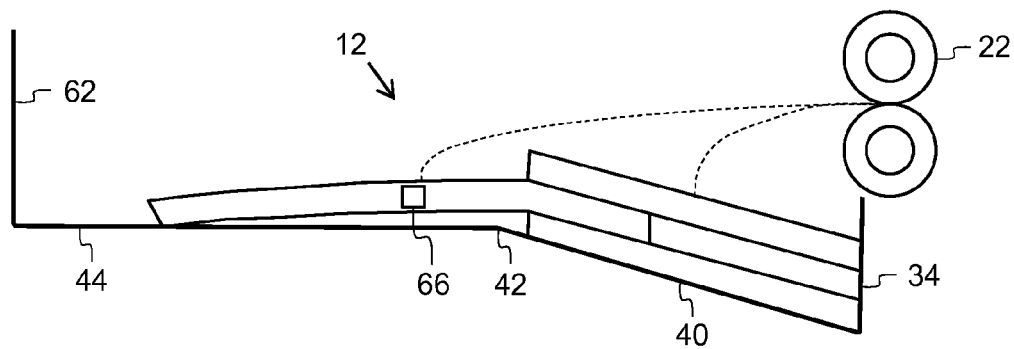
FIG. 6C is a schematic of a single exit tray configured according to a still further embodiment of the present invention.

Referring to FIG. 6C, a single exit tray is shown with a break point 42 at the end of its slope portion 40. The exit tray has a horizontal portion 44 as well. Three documents are shown sorted in the exit tray configuration using two different exit velocities. The middle document is sorted into a different resting position in the document stack 12 than the bottom and top documents, whose trailing edges 48 are registered against the back wall 34. These sorted documents are not fully separated into two stacks. As illustrated, the sorted documents remain interleaved with their trailing edges 48 offset a significant amount for identification, so the sorted documents can remain in one sorted document stack 12.

This interleaved sorting technique shown in FIG. 6C can be achieved by providing the exit velocity which will position a document's center of gravity 66 of one group of the sorted documents above the horizontal portion 44 of the exit tray. The other group of sorted documents is positioned with another exit velocity which will drop the documents so that their trailing edges 48 will rest against the back wall 34.

Figure 6D:
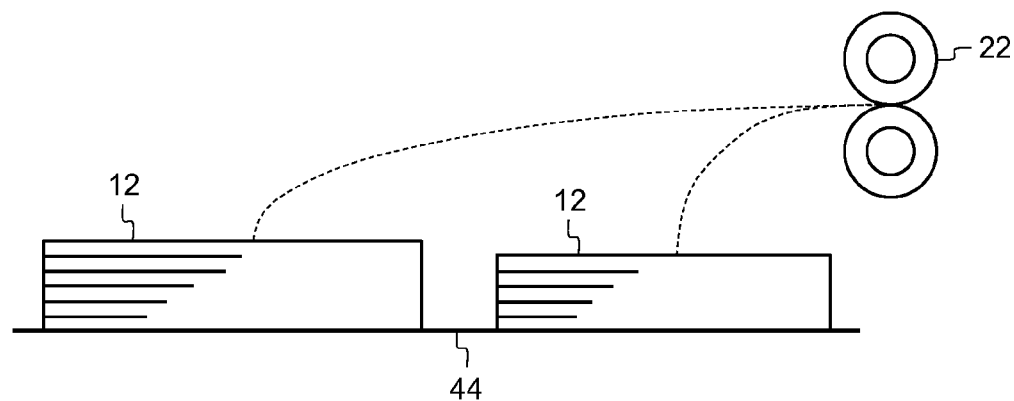
FIG. 6D is a schematic of a single exit tray configured according to a still further embodiment of the present invention.

Finally, FIG. 6D shows a simple version of a sorting configuration which uses a single exit tray capable of holding two fully separated document stacks 12. This simple configuration also provides the capability of sorting documents by adjusting their exit nip velocity into more than two document stacks 12. However, no leading or trailing edge registration is provided. This configuration can be acceptable for some applications of document scanning and sorting.

There are many sorting criteria which are possible based on the scanned image or multiple scanned images of each document. Scanners systems 10 can have two scanners 32 along the document transport path, with one scanner 32 capturing the image of the front side of each document and the other scanner 32 capturing the image of the back side of each document. For example, the image or images of each document can be used to determine the length, width and orientation (known as portrait or landscape orientation) of each document and this information can be used as the bases of a sorting criteria. The content printed on the document can be evaluated by the control logic processor 24 for each document image and used for sorting criteria as well. Other attributes of the scanned document images, such as the document color, shape, and a measure of the image quality can also be used as sorting criteria. Those skilled in the art can understand there are many document image attributes which can be used to sort scanned documents.

There are also some sorting criteria which do not use the document scanned image for sorting. The scanner system 10 operators can instruct the scanner system 10 via the input device 50 to sort documents based on document count. The document count can be determined based on the number of documents the sensor 30 detects as documents are transported. For example, creating a document stack 12 of a count of 100 documents being transferred into the first exit tray 16, and then sorting the next 100 documents transferred into the second exit tray 17 can be a sorting criteria based on document count.

Other sensors, such as an ultrasonic sensor (not shown) can be incorporated into a scanner system 10 which are capable of determining if a document is made up of a single or multiple layers. Ultrasonic sensors (not shown) are routinely used in document scanner systems for such purposes. For example, if a label, sticker or posted note attached to a document is detected on the document by the ultrasonic sensor, which is positioned along the document transport path, the document can be sorted from the other documents without another detected layer.

Similarly, a microphone (not shown) can be incorporated into the scanner system 10, and the sound (frequency and amplitude pattern) of each document fed through the document transport apparatus 38 can be captured by the microphone and analyzed by the control logic processor 24, and can be used as a sorting criteria. Documents of different thicknesses or conditions (such as a wrinkled documents, or folded documents) make different sound patterns as they are transported. Therefore, the microphone incorporated into the scanner system 10 in conjunction with the control logic processor 24 can be used to sort documents based on thickness or condition.

The invention has been described in detail with particular reference to certain preferred embodiments thereof, but it will be understood that variations and modifications can be effected within the spirit and scope of the invention.

PARTS LIST

10 scanner system
12 document stack
14 input tray
15 document feed mechanism
16 first exit tray
17 second exit tray
18 rollers
19A movable member
19B movable member
20 transport
22 exit nip transport
24 control logic processor
26 first motor
28 second motor
29 belt and pulley arrangement
30 sensor
32 scanner
34 back wall
36 lead edge back wall
38 document transport apparatus
40 slope portion
42 break point
44 horizontal portion
46 leading edge
48 trailing edge
50 input device
54 motor control Parts List Cont'd

56 memory
60 document
62 back stop
64 corrugation fire
66 center of gravity

The invention claimed is:

1. A method of scanning different types of documents and moving such documents along a path such that after scanning, the documents are sorted in accordance with document type, comprising:

providing a plurality of documents in an input tray;

transporting each document along the path from the input tray at a transport velocity past the scanner to obtain scanned image data;

recognizing the type of each document that includes length and using at least one edge detector sensor for determining the length of each document;

providing at least two movable members including two rotatable exit rollers, movable belts, or a movable belt and a rotatable roller along the path to provide a nip for the documents; and selectively driving the movable members to provide selectable exit velocities so that such documents are sorted in accordance with their selected exit velocity, wherein the document type is provided to a processor which controls the selected velocity of the two movable members.

2. The method of claim 1 wherein further including providing a single exit tray for receiving documents driven by the two movable members and wherein the documents are sorted in the exit tray by document type.

3. The method of claim 1 further including providing at least two exit trays and delivering documents from the two movable members to different exit trays depending on the selected exit velocity.

4. The method of claim 1 wherein the scanning step includes providing a linear image sensor or an area array image sensor.

5. The method of claim 1 wherein the document type further includes width, thickness, shape, condition, color, orientation, weight, content, count, number of layers in the document, and document sound as it is transported.

6. The method of claim 1 wherein the selectively driving step further includes separating the documents into separated exit stacks.

* * * * *